Sept. 13, 1966     L. A. REZIN     3,271,975
ABSORPTION REFRIGERATION APPARATUS WITH PURGING MEANS
Filed April 5, 1965
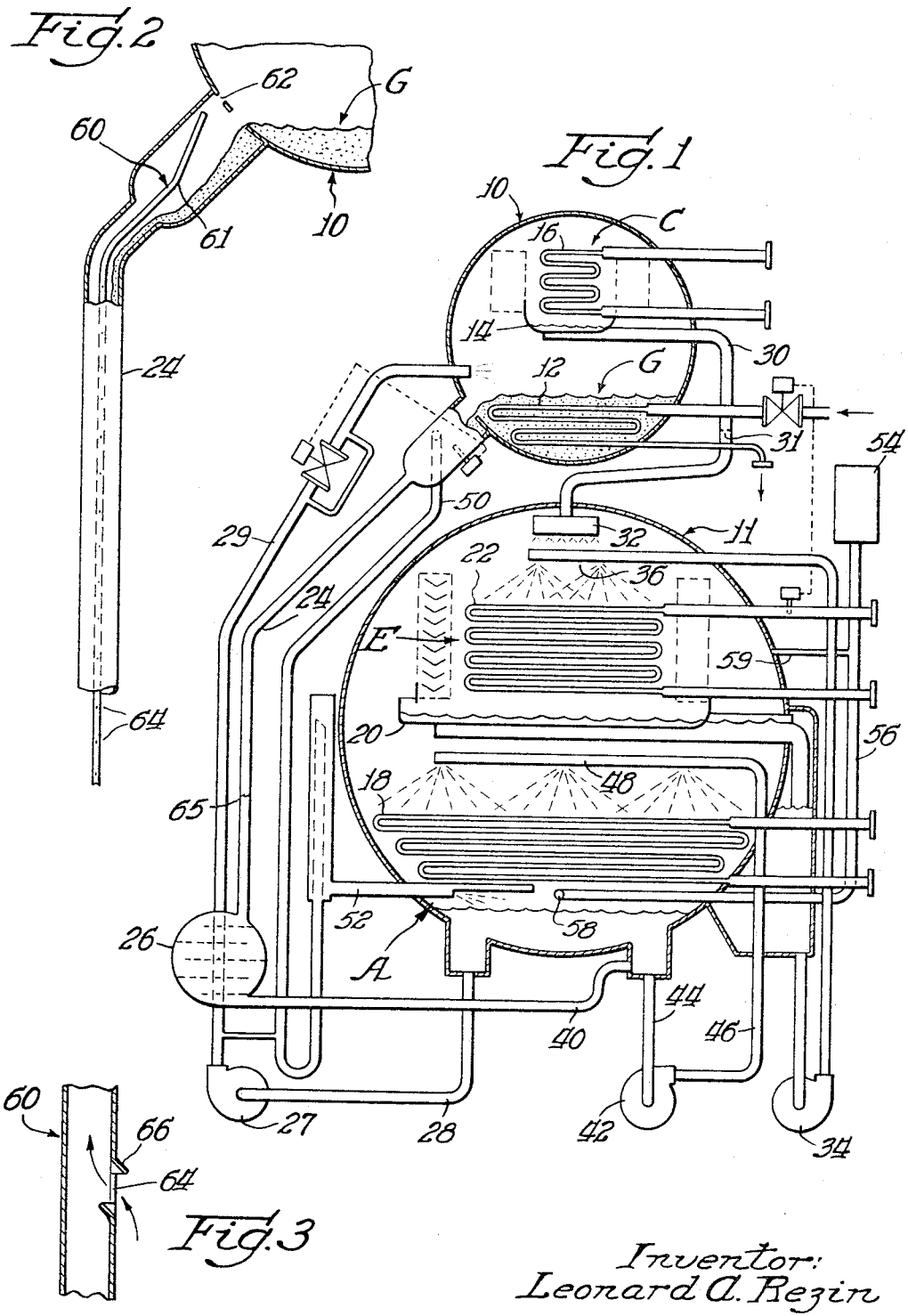
Inventor:
Leonard A. Rezin
By: Thomas B. Hunter  Atty.

United States Patent Office 3,271,975
Patented Sept. 13, 1966

3,271,975
ABSORPTION REFRIGERATION APPARATUS
WITH PURGING MEANS
Leonard A. Rezin, York, Pa., assignor to Borg-Warner
Corporation, Chicago, Ill., a corporation of Illinois
Filed Apr. 5, 1965, Ser. No. 445,487
8 Claims. (Cl. 62—475)

This invention relates generally to absorption refrigeration apparatus, and more particularly to means for venting non-condensible gases to facilitate their removal by a purge unit.

The conventional absorption refrigeration system comprises a generator, a condenser, an evaporator, and an absorber connected to provide a closed, continuous cycle refrigeration circuit. While various refrigerant/absorbent combinations may be used, this specification will refer to a system using a hygroscopic, saline solution, such as lithium bromide, as the absorber, and water as the refrigerant.

Insofar as the flow of solution is concerned, the concentrated absorber solution (approximately 65% LiBr by weight) is forwarded from the generator to the absorber to absorb water vapor therein, while dilute absorber solution (approximately 59% LiBr) is passed from the absorber to the generator where it is heated to liberate the refrigerant and concentrate the solution. In the refrigerant circuit, refrigerant water vapor flows from the generator to the condenser where its latent heat is removed; and the condensed, liquid refrigerant is then circulated to the evaporator which operates at a relatively lower pressure, approximately 7 mm. mercury absolute, as compared to a pressure of about 75 mm. mercury absolute existing in the condenser.

Absorption refrigeration systems require that non-condensible gases be removed therefrom in order to operate efficiently. Even in small quantities, the presence of such non-condensible gases greatly reduces the refrigeration capacity of the unit. The evaporator-absorber shell in a typical absorption system, as pointed out above, operates at an absolute pressure of less 1/100 of an atmosphere; therefore, air tends to leak through minute passages in the joints or welds of the machine. The air leaking into the machine is composed of gases (nitrogen, oxygen, and minor amounts of inert gases) which are relatively non-condensible and prevent proper absorption of the refrigerant by blanketing the absorber solution and by reducing the heat transfer from the solution to the tubes. Moreover, the oxygen in the air which leaks into the absorption system reacts with the metal from which the machine is constructed, e.g. copper and steel, and creates a serious corrosion problem. The corrosion of the metal surfaces, particularly in the presence of lithium bromide, a powerful electrolyte, may be so severe as to cause complete failure of the machine after a relatively short period of time.

By-products of corrosion reactions, which occur in the machine even in the absence of oxygen, constitute another source of non-condensible gases. For example, hydrogen may be liberated as a by-product of galvanic corrosion between copper and steel in the presence of an electrolyte, such as the LiBr absorber solution.

In view of the foregoing, it is conventional to provide a purge unit which is operative to remove these non-condensible gases. While such purge units may take many forms, they commonly employ a vacuum pump, either operating alone, or in combination with a secondary absorber which uses the absorber solution to pump out part of the vapor in the absorber-evaporator shell and the entrained gases therein. In a typical purge system, there is a conduit extending into the lower part of the absorber above the normal solution level therein which leads to the suction side of the purge pump, said pump being operated intermittently throughout the cycle. The problem is that these non-condensible gases have a tendency to be collected and trapped in various places throughout the apparatus where they cannot be effectively removed by the purge system. One such place, for example, is in the solution heat exchanger which is provided for passing the concentrated and dilute solution streams in heat exchange relation with each while flowing to the absorber and generator respectively. While the solution heat exchanger is normally filled with solution, a pocket of gas can accumulate in the heat exchanger shell above the solution feed line, displacing a part of the solution in the shell. This gas results in a marked increase of the corrosive effect of the lithium bromide solution due to the presence of oxygen at the point where the solution contacts the metal in the heat exchanger. Ordinarily, this pocket of gas would eventually flow upwardly through the conduit leading to the generator; but in many systems, the flow of solution from the generator to the absorber takes place in a vertical conduit into which the concentrated solution travels in open sewer flow downwardly through the same. Non-condensible gases trying to rise within the conduit are, in effect, entrained in the solution and carried into the solution heat exchanger.

The present invention provides a very simple but effective means for preventing this gas from becoming trapped in the solution heat exchanger and reduces the corrosion resulting therefrom. It is, therefore, a principal object of the invention to provide an absorption refrigeration system with means for exhausting and venting non-condensible gases from the concentrated solution line to prevent them from collecting in the solution heat exchanger.

It is another object of the invention to provide means for venting gases from the concentrated solution line back to the generator where they can flow to the absorber and be removed from the system by the conventional purge system.

It is still another object of the invention to provide vent means in accordance with the foregoing objects which is positioned within the concentrated solution line and yet is not interfered with by the solution flowing downwardly therethrough.

Additional objects and advantages will be apparent from reading the following detailed description taken in conjunction with the drawing wherein:

FIGURE 1 illustrates in schematic form, an absorption refrigeration system which provides the environment for the principles of the present invention;

FIGURE 2, in partial cross-section, is an enlarged view of a portion of the concentrated solution conduit and illustrating the gas venting means of the invention; and FIGURE 3 is a detailed cross-sectional view of a portion of the vent tube.

Referring now to FIGURE 1, the absorption refrigeration apparatus comprises upper and lower shells 10 and 11, the upper shell housing a generator G including a heat exchanger 12, supplied with a heated fluid such as steam or hot water, and a pan 14 cooperating with a second heat exchanger 16 to provide a condenser C. The lower shell 11 houses an absorber A including a heat exchanger 18, and a pan 20 cooperating with a second heat exchanger 22 to provide an evaporator E. Heat exchanger 22, often referred to as the chilled water coil, is used to cool a circulating stream of water or other heat exchange media which is circulated to and from a load (not shown).

Concentrated absorber solution flows by gravity in open sewer relation from the generator to the absorber through an enlarged vertical conduit 24. In passing to the absorber, the solution flows through the solution heat exchanger 26 where it passes in heat exchange relation with the relatively dilute absorber solution which is being pumped by pumping means 27 through conduits 28, 29 from the absorber to the generator.

The refrigerant vapor which is boiled out of the solution in the generator flows upwardly where it condenses on the external surface of the heat exchanger 16 in the condenser. The condensed liquid refrigerant is collected in pan 14 and then flows through line 30, provided with an orifice 31 to maintain the pressure differential between the upper and lower shells, which interconnects the condenser with the evaporator, to a refrigerant distributor 32 located above the evaporator heat exchanger 22. Any liquid refrigerant not evaporated during its pass over the evaporator heat exchanger tubes is collected in pan 20 and the overflow is re-circulated by means of a refrigerant pump 34 to a distributor 36.

The desired evaporator pressure is maintained in the absorber-evaporator shell by the action of the "thirsty," relatively concentrated absorber solution which rapidly absorbs the water vapor formed in the evaporator. Cooling water from a cooling tower or other suitable source (not shown) is directed in series through the absorber heat exchanger 18 and condenser heat exchanger 16.

The concentrated solution flows from the heat exchanger 26 to the absorber through line 40 and enters the absorber shell at a point well below the normal solution level in such a way that it mixes with the relatively dilute absorber solution therein. The resulting intermediate strength mixture is pumped by the solution pump 42 through lines 44 and 46 to a spray type distributor 48 positioned above the absorber heat exchanger 18. The dilute solution is taken off from the absorber through line 28 at a point spaced from the point where the concentrated solution mixes with the dilute solution at the entrance end of line 44.

Preferably, the apparatus includes means for bypassing strong solution around the solution heat exchanger 26 in the event crystallization occurs therein. Accordingly, a bypass line 50 interconnects the upper portion of conduit 24 with a conduit 52 opening into the absorber underneath the heat exchanger 18. The details of this bypass system are more particularly described in co-pending application, Serial No. 442,562, Neil E. Hopkins, filed December 24, 1964.

The system for purging non-condensible gases from the apparatus may take several forms. For example, purge systems comprising a vacuum pump used alone or in combination with a unit which circulates absorber solution to pull vapor and entrained gases out of the system, are well known in the prior art. As shown in FIGURE 1, the purge unit is designated generally at 54 and is interconnected with the absorber through line 56 which terminates in a suction tube 58 running the length of the shell above the normal solution level in the absorber. The location of the entrance end of the purge system in the area above the solution in the absorber is chosen because the non-condensible gases tend to collect in this zone. An additional purge relief line 59 communicates with the area on one side of the evaporator to prevent the removal of solution, should suction tube 58 accidentally be covered with solution.

As noted in the preliminary remarks, there are some places in the system where non-condensible gases tend to collect in such a way that they cannot be effectively removed by the purge unit. This is especially true of the solution heat exchanger 26 which is normally filled with solution. Consequently, should gases be admitted into the solution heat exchanger, they will be trapped between the top of the heat exchanger shell and the level of solution line 24 entering therein. Naturally, the gases will try to rise within the concentrated solution line 24 where they can be exhausted into the upper shell and eventually be transferred to the absorber for removal by the purge unit. The problem is that the solution spilling down through the concentrated solution line 24 prevents the gas from rising in this line and is consequently trapped in the solution heat exchanger. It is impractical to connect the purge unit into the heat exchanger since this would tend to draw off liquid (solution) therefrom and would require expensive and complicated gas/liquid separation apparatus to insure that this could not take place.

As shown best in FIGURE 2, the present invention contemplates the use of a vent tube extending down through the concentrated solution line 24, said tube 60 having an upper end 61 located adajcent the generator shell so that vapor can be passed above the solution level in the generator through a series of openings 62 in the shell. Throughout a major portion of its length, the vent tube is provided with a series of openings 64 into which the vapor in conduit 24 may pass to be exhausted into the generator-condenser shell 10.

During the operation of the apparatus, a solution level, indicated at 65 in FIGURE 1, will form in the concentrated solution line well above the entrance end to the solution heat exchanger 26. It is preferred that the lower end of the tube 60 extend down into the solution. As shown best in FIGURE 3, the openings 64 in vent tube 60 extend radially outwardly and downwardly to provide a shield 66 near the upper portion of each opening to prevent solution from interfering with the flow of vapor into the interior of the vent tube. It can be seen then that the vent tubing, in effect, provides a dead air space centrally of the concentrated solution conduit so that the gases can be vented without being carried into the solution heat exchanger by the entraining effect of the solution splashing down through the conduit.

While this invention has been described in connection with a certain specific embodiment thereof, it is to be understood that this is by way of illustration and not by way of limitation; and the scope of this invention is defined solely by the appended claims which should be construed as broadly as the prior art will permit.

What is claimed is:

1. Absorption refrigeration apparatus comprising a generator, a condenser, an evaporator, and an absorber connected to provide a closed, continuous cycle refrigeration circuit; means for transferring relatively dilute absorber solution from the absorber to the generator; means for transferring relatively concentrated absorber solution from the generator to the absorber, said means including a substantially vertical conduit interconnecting said generator and said absorber, said generator and absorber being arranged such that solution flows by gravity in open-sewer fashion from the generator to the absorber; a purge unit interconnected with said refrigeration circuit for removing non-condensible gases from said circuit; and means associated with said conduit for venting non-condensible gases therein to said generator, said means including an elongated tube disposed internally of said conduit, said tube extending through a substantial portion of said conduit whereby any non-condensible gases whose upward flow through said conduit is impeded by the solution flowing downwardly therethrough can be effectively removed for subsequent elimination by said purge unit.

2. Apparatus as defined in claim 1 wherein said tube includes means defining a plurality of openings along the lower portion thereof to admit non-condensible gas and allow it to flow upwardly to said generator.

3. Apparatus as defined in claim 2 wherein said openings extend radially outwardly and downwardly.

4. Apparatus as defined in claim 3 wherein the upper portion of said opening defining means projects outwardly to deter the admission of solution into said tube.

5. Absorption refrigeration apparatus comprising a generator, a condenser, an evaporator, and an absorber connected to provide a closed, continuous cycle, refrigeration circuit; means for transferring relatively concentrated absorber solution from the generator to the absorber, said means including a substantially vertical conduit connecting the generator and the absorber in such a way that the solution flows by gravity, in open-sewer fashion, downwardly therethrough; means for transferring relatively dilute solution from the absorber to the generator; a heat exchanger arranged to pass the dilute and concentrated solution streams in heat exchange relation with each other, said conduit feeding said relatively concentrated solution into said heat exchanger; and venting means associated with said conduit for permitting non-condensible gases therein to flow into said generator, said venting means including an elongated tube disposed internally of said conduit with a portion of said tube extending through a substantial portion of said conduit, thereby preventing said gas from being trapped in said heat exchanger.

6. Apparatus as defined in claim 5 wherein said tube includes means defining a plurality of openings along the lower portion thereof to admit said non-condensible gases and allow them to flow upwardly to said generator.

7. Apparatus as defined in claim 6 wherein said openings extend radially outwardly and downwardly.

8. Apparatus as defined in claim 7 wherein the upper portion of said opening defining means projects outwardly to deter the admission of solution into said tube.

References Cited by the Examiner
UNITED STATES PATENTS

| 2,940,273 | 6/1960 | Leonard | 62—475 X |
| 3,131,552 | 5/1964 | McNeely | 62—475 |

ROBERT A. O'LEARY, *Primary Examiner.*

MEYER PERLIN, *Examiner.*

W. E. WAYNER, *Assistant Examiner.*